Patented Feb. 27, 1940

2,191,835

UNITED STATES PATENT OFFICE 2,191,835

FOOD PROCESS AND PRODUCT

Marjorie G. Snelling Allentown, Pa.

No Drawing. Application September 24, 1936,
Serial No. 102,398

4 Claims. (Cl. 99—100)

My invention relates to improved methods of treating solid natural food materials and to the products resulting therefrom. One of the objects of my invention is to provide digestible and palatable food products containing increased amounts of calcium in readily assimilable form.

I have discovered that by impregnating vegetable or animal food material such as common vegetables, fruit or meat tissue with a soluble calcium salt, as by soaking the food material in a solution of water-soluble calcium salt, the calcium salt is readily absorbed by the food tissue. The amount of the water-soluble calcium salt taken up by the tissue may be controlled by controlling the concentration of the solution of calcium salt, the time of soaking, or by giving the tissue a partial or complete dehydration treatment prior to soaking in the water-soluble calcium salt solution. I next wash the resulting product, to remove the soluble calcium salt present on its surface, and I then soak the food tissue in a solution containing a salt capable of reacting with the water-soluble calcium salt, to form a water-insoluble calcium salt. A water-insoluble calcium salt is then formed directly within the plant or animal tissue, and forms an integral part of the food product, indistinguishable in its nature, but readily distinguishable in its amount, from the natural calcium content of the fruit, vegetable or other food product treated. Thus, in dried fruits my calcium compound is formed in non-crystalline, non-gritty form and remains so, without crystallizing, for a substantial period of time, say, for several months or longer.

It will be evident that as the essential or significant feature of my invention is the precipitating of a relatively insoluble calcium salt within the vegetable or animal tissue of the product being treated to increase its calcium content, by the interaction of a water-soluble calcium salt and an agent capable of precipitating a less soluble calcium salt by reaction with the water-soluble calcium salt solution, the treatment with the calcium solution may either precede or follow the treatment with the precipitating reagent. For convenience in stating the principles of my invention I will refer to the solution first absorbed or taken up by the cellular food product as my penetrating reagent and to the solution thereafter absorbed by the cellular tissue as my precipitating reagent, but from what has just been said it will be evident that the water-soluble calcium salt may be used either as a penetrating reagent, to be followed later by a precipitating solution, or may be used as a precipitating reagent, when a water-soluble reagent capable of reacting with a calcium salt to precipitate an insoluble calcium salt has been used as a penetrating reagent.

It will also be evident that at times it may be desirable to alternate these two classes of reagents, to obtain an increased precipitation of calcium within the cellular tissue, and that accordingly several cycles of reaction may be employed. In still another modification of my invention I first employ a reagent such as glycero-phosphoric acid as a penetrating reagent, followed by a water-soluble calcium salt as a precipitating reagent, and this in turn being followed by a further quantity of glycero-phosphoric acid, or an equivalent such as sodium carbonate, as a "clean-up" reagent, for the purpose of reacting with any traces of unreacted calcium that may be present in the food product. I find this procedure particularly desirable when using a reagent, as either a penetrating reagent or a precipitating reagent, that imparts a marked taste to the treated product, and by the described process, or by prolonged soaking, washing or both, I may remove all unreacted reagents from my product, leaving only the precipitated calcium products imbedded within the cellular tissue.

Although the concentration of both my penetrating reagent and my precipitating reagent may be varied over exceptionally wide limits while still obtaining satisfactory results, I prefer to employ my penetrating reagent in a concentration of from 1% to 5%, and my precipitating reagent in a concentration of from 3% to 8%, the two solutions being impregnated separately into the food, that is, not simultaneously. The concentration of the reagents, however, and the time of application of the reagents, will necessarily depend upon the amount of insoluble calcium salt that it is desired to precipitate within the food tissue. In employing dried or desiccated food products, either vegetable or animal, I find that it is desirable to employ somewhat lower concentrations of reagents than I employ in the treatment of undried food products. Dried fruits, such as dried apples, dried apricots, dried prunes, and the like, and dried cereal grains such as dried sweet corn, peas, and the like are preferably soaked in the penetrating reagent for about half of their normal swelling period, and are then carefully washed and immersed in the precipitating reagent for the remainder of their swelling period. It will of course be evident that upon the completion of the precipitating step, the thorough washing of the treated food tissues is desirable, to remove any unreacted reagent that may impart an unpleasant taste, or the presence of which may otherwise be undesirable. Soaking in water and preferably in running water, results in the elimination of all excess of reagent, while having little or no effect upon the insoluble calcium salt precipitated within the cellular tissue of the fruit, vegetable or other food product that has been treated.

In the above example, the food is soaked in the first solution for a portion only of its normal period of rapid swelling when immersed in water or an aqueous solution.

The food product selected for the treatment in accordance with the invention is in the form of water-insoluble units of usual commercial type. Such units are herein referred to as "coherent". Such coherent units do not permit the removal therefrom of the precipitated enriching calcium compound, in the normal use of the food product, except as the units undergo digestion. While the units may be dried or dehydrated before any impregnating treatment is undertaken, it is not necessary that they be completely dried. The degree of dryness prevailing in commercial units of the several kinds is satisfactory.

My invention has many important advantages in the treatment of food products, but its most important advantage is that it produces calcium-enriched food products containing calcium much in excess of the natural calcium content of such food products, the added calcium existing in the food product in a form indistinguishable from the natural calcium content of food products, but being readily distinguished therefrom because of its increased amount. Products made in accordance with my invention may be readily distinguished from natural untreated vegetable products because of the increased ash content, which may be made, if desired, to amount to several times the normal ash content of the vegetable, without being evident by any change in the taste, odor or appearance of the treated product. Because of the finely divided condition of the calcium precipitate produced in accordance with my present invention, and its dissemination within the cellular mass of the food product in which it has been formed by precipitation, the calcium is readily taken up by the body in the course of normal digestion, and under these circumstances behaves quite differently from calcium taken medicinally in the form of tablets or capsules or the like.

In the practice of my invention, I may employ any suitable calcium salt that is sufficiently soluble in water to enable a proper concentration of the calcium to be introduced by osmosis into the plant tissue, but I prefer to employ such salts as calcium acetate, calcium chloride, calcium citrate, calcium formate, calcium hypophosphite, calcium lactate, or calcium nitrate, employing a slightly elevated temperature when salts of relatively low solubility in cold water are used. I wish to point out, however, that the matter of solubility of the calcium reagent is not a factor of extreme importance, as I have successfully employed even such an insoluble material as calcium sulfate in the treatment of rhubarb to reduce its poisonous properties. Where such relatively insoluble calcium salts are used, I prefer to employ some of the solid salt in my reagent solution, and the reason for the efficacy of such reagents is undoubtedly that the precipitating reagent produces very insoluble material, (calcium oxalate for example, being almost completely insoluble in water,) and thus is precipitated within the plant tissue in a form that is harmless to the body, as it is not decomposed in the digestive process.

The reagents that I prefer to employ as precipitating agents for the calcium are any suitable salt, acid salt or acid that reacts with calcium to form a relatively water-insoluble product that is assimilable and non-poisonous in the process of digestion. Although sodium carbonate or any other suitable water-soluble carbonate or bicarbonate is my preferred calcium precipitating agent, because of the highly satisfactory nature of calcium carbonate as a calcium precipitate, I may use many other reagents as calcium precipitating agents such as phosphoric acid and water-soluble phosphates, but the alkali gluconates, gluconic acid, d-glucono delta lactone and the hypophosphates and particularly the glycero-phosphates are highly desirable and satisfactory materials. The radicals (non-metallic parts or the portions which combine with the calcium to give the insoluble precipitate) are non-poisonous.

Since my process permits the removal by osmosis through a soaking operation of any water soluble products of reaction that are produced, while leaving the insoluble calcium salt precipitated in insoluble form in the food tissue, it will be evident that I may employ as my calcium reagent any calcium salt that is reasonably soluble in water up to its boiling temperature, and as my calcium precipitating reagent I may employ any acid, acid salt or neutral salt that produces with calcium a non-poisonous highly insoluble reaction product, and accordingly the reagents which I have referred to in this specification and in the examples herein given are mentioned for purposes of illustration only, and my invention is not limited to the use of these particular compounds, and I can readily remove by osmosis the residual or excess solutions and by-products while leaving the precipitated calcium salt in desirable form within the substance of the food tissue.

My invention is particularly applicable to the treating of foods for infants and invalids, to increase and to modify its calcium content. It is well recognized that most normal diets are slightly deficient in calcium, and that increased calcium is desirable in the food of many persons. At the present time additional calcium is often taken in the form of calcium salts such as calcium lactate and particularly calcium gluconate, but my invention enables the calcium content of the diet to be controlled by actual modification of the calcium content of the food itself. This has many advantages, but particularly in that the calcium from vegetable products treated in accordance with my present invention is liberated in the digestive process in the course of the digestion of the other food products in the stomach, and calcium thus liberated at the time of digestion takes part in the calcium metabolism of the body in a more efficient and in a more natural way than calcium that is taken into the body in more concentrated form.

My invention may be applied to advantage in the cooking of vegetable products, as a part of the cooking step, and particularly in connection with combined cooking and canning operations. In the factory production of foods of increased calcium content prepared in accordance with my present invention, carbon dioxide gas may be employed to advantage as a precipitating reagent instead of sodium carbonate, following the soaking of the vegetable product in a solution of a water-soluble calcium salt such as calcium acetate, calcium lactate or the like. By employing carbon dioxide under pressure the water-soluble calcium salt may be converted into calcium carbonate within the vegetable tissue, and this process results in less modification of the taste of the product than is produced in some of the other methods of treatment.

It will be evident that many modifications may be made without departing from the scope of the invention as herein disclosed, and accordingly no limitations should be made upon my invention, except as indicated in the appended claims.

I claim:

1. In making an improved food product, the method which comprises soaking units of a water-insoluble cellular solid food separately in an aqueous solution of a non-poisonous calcium compound and in an aqueous solution of a non-poisonous agent adapted to form with the said calcium compound a water-insoluble assimilable precipitate, the units being washed with water after soaking in one of the solutions and before soaking in the other solution, so as to remove solution of the kind first used from the surface portions of the said units.

2. In making an improved food product, the method which comprises soaking a cellular food in the form of water-insoluble coherent units separately in an aqueous solution of a non-poisonous calcium compound and in an aqueous solution of a non-poisonous agent adapted to form a water-insoluble assimilable precipitate with the said calcium compound, the soaking in the solution first used being continued for a portion only of the normal period of rapid swelling of the units in water before the soaking in the other of the said solutions.

3. The method described in claim 2, the concentration of the calcium compound and said agent in the solutions as used being each of the order of at least 1% by weight.

4. As an article of manufacture, cellular food containing within the tissue thereof a water-insoluble assimilable non-crystalline compound of calcium and a non-poisonous radical, the said compound in the food being non-crystallizing over a substantial period of time and the proportions of calcium and said radical being substantially in excess of any amount thereof occurring naturally in the said food.

MARJORIE G. SNELLING.